May 8, 1962 T. C. KERR 3,032,867

CONNECTION TOOL

Filed Sept. 22, 1958 3 Sheets-Sheet 1

INVENTOR
THOMAS C. KERR
BY
ATTORNEYS

CONNECTION TOOL

Filed Sept. 22, 1958 3 Sheets-Sheet 2

INVENTOR
THOMAS C. KERR
BY
ATTORNEYS

INVENTOR
THOMAS C. KERR
BY
ATTORNEYS

United States Patent Office 3,032,867
Patented May 8, 1962

3,032,867
CONNECTION TOOL
Thomas C. Kerr, 1138 Herbert St., Philadelphia, Pa.
Filed Sept. 22, 1958, Ser. No. 762,436
2 Claims. (Cl. 29—213)

The present invention relates to a connection tool for use in gas piping and the like.

A purpose of the invention is to improve and facilitate changing of gas piping which is under pressure without cutting off service.

A further purpose is to increase the safety both from the standpoint of the customer and the repair man in making repairs, extensions and modifications in gas piping.

A further purpose is to facilitate changing of meters without cutting off service.

A further purpose is to accomplish modifications and extensions of gas piping by permitting removal of a plug, connecting a pipe where the plug formerly was, connecting a T to the piping, and connecting other piping, all with safety to the repair man, and without danger or inconvenience to the customer.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURES 10 to 23 inclusive are fragmentary diagrammatic elevations, in some cases including parts in axial section, showing steps in a process according to the present invention.

Figure 24:
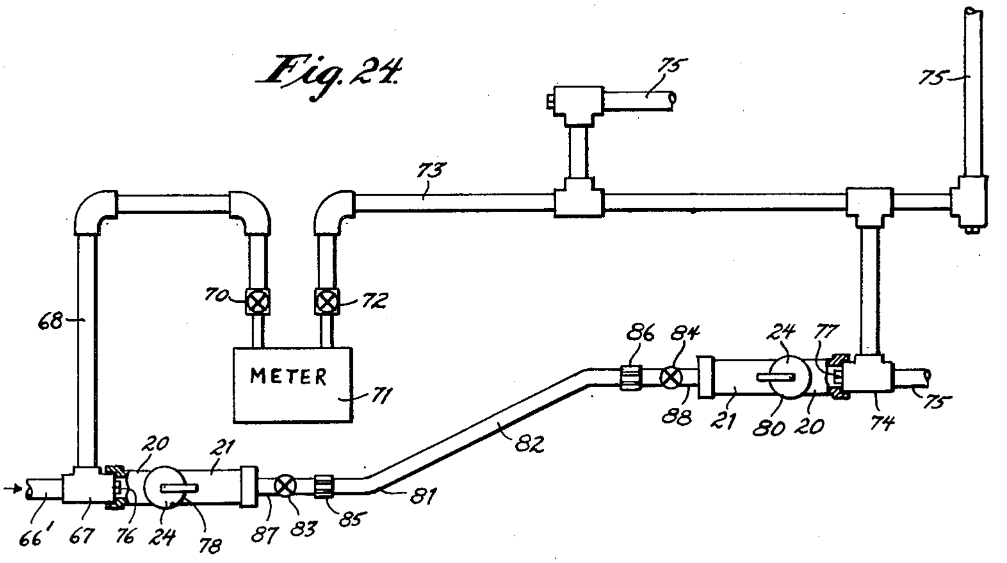
Figure 10:
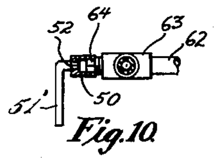

FIGURE 24 is a diagram of a piping set-up to which the invention is applied to connect a jumper. For convenience in illustration, various vertical pipes 75 which extend upward have all been rotated into the plane of the paper.

At the present time there are a number of different occasions on which it is desirable to do work in gas piping without cutting off the pressure. When the pressure is cut off, particularly in apartment houses and other multiple occupancy buildings, it is unsafe and therefore not permissible to turn on the gas without being able to gain access to all apartments or other locations where gas equipment exists. Therefore, in many instances the repairman must make repeated visits to the premises until he can gain access to all appliances supplied from the particular service.

It is also important in many industrial operations to continue uninterruptedly without shutting down.

The present invention makes it possible for the repairman with complete safety to himself and to the customer to operate on piping which is under pressure.

One application of the invention is in making extensions or modifications to existing piping, either to add new facilities or to replace defective piping. Another use of the invention is to correct low pressure or complete line stoppages which may occur in risers or the like.

The invention may also be applied usefully to jump or short circuit portions of a line which is provided with cocks.

A typical illustration of this is to permit changing a master meter in a multiple tenant installation or industrial plant.

In many communities it is the practice to provide a master meter with line cocks on the inlet and outlet sides, and a T must be provided at the bottom of each riser.

In accordance with the invention I provide a tool extension casing which makes it possible for the serviceman to remove a plug from a T or other fitting while maintaining gas pressure conditions and operating in perfect safety and then to connect a pipe in the threads formerly occupied by the plug, make suitable extensions or modifications in the piping system connected to the initial pipe installed, and then finally open the extended pipe to gas pressure, without at any time cutting off the gas pressure from existing piping.

While it is believed that the invention finds its widest application in domestic and industrial gas piping, it will be evident that it is applicable wherever gases are transported through pipes, and where it is important to continue operation, avoid intermixture with air of the gas content, or protect service personnel from a hazardous gas ingredient.

The principles of the invention can also be applied where liquids are transported under moderate pressure, and it is desirable to avoid shutting off pressure from the liquid lines and avoiding leakage.

An important feature of the invention is that it permits operation without any appreciable change in the pressure in existing gas piping. This is of great importance because modern gas pilot devices are extremely sensitive to pressure changes and the pilot is likely to go out if appreciable leakage occurs, which causes marked change in the pressure of the gas reaching the pilot.

Considering now the equipment utilized in the invention, I employ a tool extension casing (FIGURES 1 to 6) which has a forward end tube 20 and a rear end tube 21, in line with one another, and having internal bores which are directly straight and in line. The bore increases, but does not reduce from the rear end to the forward end. The forward and rear end tubes are connected by a valve 22 which consists in the preferred embodiment of a plug casing 23, a plug 24, riding and sealing in the plug casing and suitably tapered to conform to the taper of the casing as shown, and having interior openings through both the plug and the casing at 25, 26 which is suitably of the same diameter as the interior bore through the end tubes and in open position in line therewith. The plug is manipulated by a suitable handle 27 and is provided with an index and limiter 28 which engages stops 30 and 31 on the plug casing. The plug is desirably urged toward seat position by helical compression spring 32 which surrounds a plug extension 33, and acts between a washer 34 around the bottom of the casing, and a washer 34' held by a nut 35 threaded on the plug extension.

At the forward end, the tool casing has a recessed flange 36 which receives a resilient gasket 37 suitably of rubber, adapted to engage and seal on the shoulder which surrounds the end of a T or other piping fitting. In order to secure the device in place against a pipe fitting, I provide a helical expansion spring 38, which at one end engages in an opening 39 in an ear on the side of the forward end of the tool extension casing, and at the other end connects with a take-up stud 40 which has threaded thereon a wing nut 41 engaging behind spaced dogs 42 which are suitably spaced to retain the wing nut or an associated washer.

At the rearward end, the casing is provided with male threads 43 and receives a suitably female threaded gasket or retaining nut 44 which suitably receives a resilient preferably rubber tapering large gasket 45 adapted to seal on the outside of a pipe as later explained, and also a resilient suitably rubber washer type gasket 46 having a smaller opening adapted to engage a tool such as a wrench or stopper puller.

The large gasket has an exterior surface of revolution which conforms to a portion of a sphere, at 47, and engages a narrower spherical surface of revolution 48 on the nut.

Figure 1:
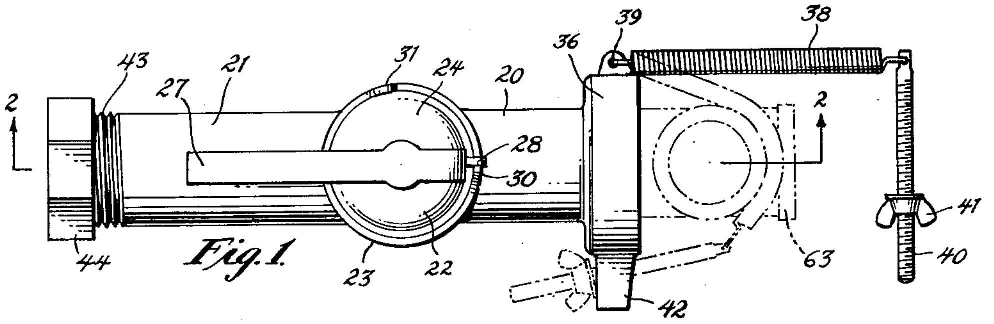
FIGURE 1 is a top plan view of the tool extension casing with the pipe T to which it is connected shown in phantom.
Figure 2:
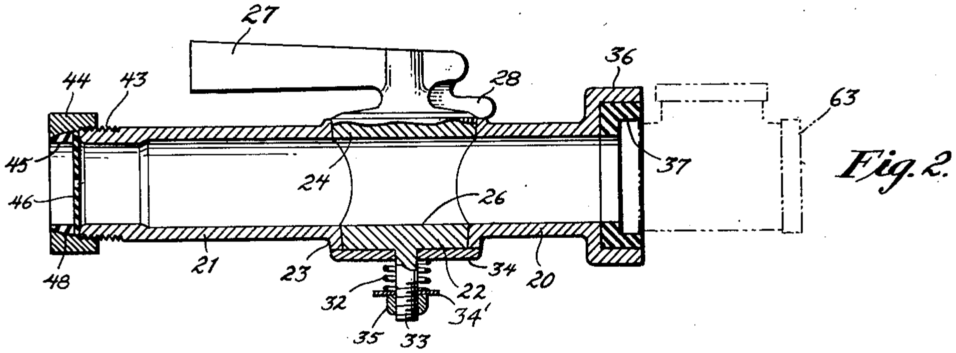
FIGURE 2 is a section on the line 2—2 of FIGURE 1.
Figure 3:
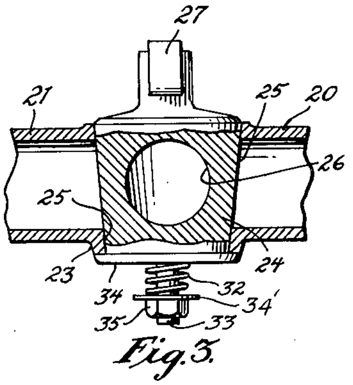
FIGURE 3 is a fragment similar to FIGURE 2, but showing the valve in closed position.
Figure 4:
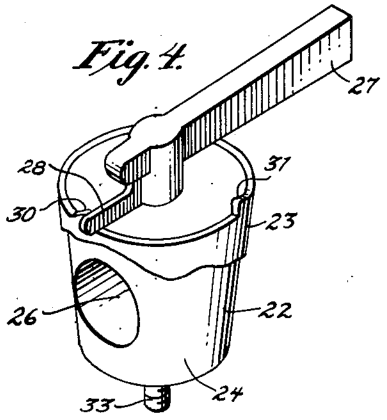
FIGURE 4 is a fragmentary perspective of the valve portion of the tool extension casing.
Figure 6:
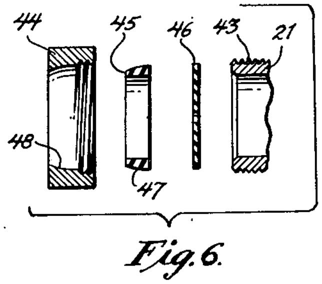
FIGURE 6 is an exploded axial section of the rear end of the tool extension casing.
Figure 5:
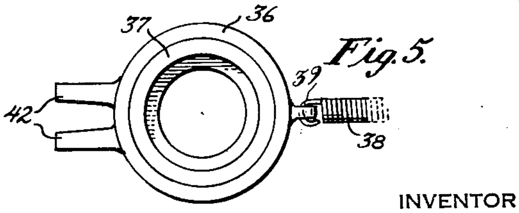
FIGURE 5 is a front end view of the tool extension casing with some of the parts omitted for clarity.
Figure 7:
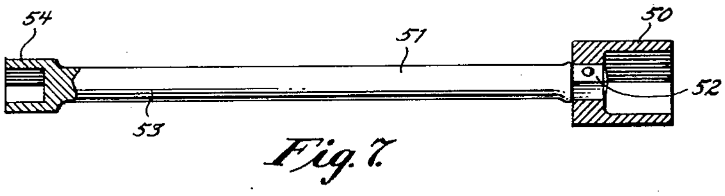
FIGURE 7 is a side elevation of the socket and extension with the ends shown in axial section.

The wrench employed in the present invention may suitably be a standard socket wrench (FIGURE 7) having a socket head 50 of well known type which is magnetized, interconnecting with a socket extension 51 which has a suitably squared detent provided end 52 engaging in a squared recess at the back of the socket, a shank 53 of generally uniform circular cross section, and a socket portion 54 at the rear end having a suitably squared socket, which can optionally engage a handle if desired.

Figure 9:
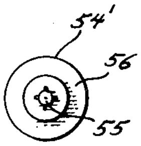
FIGURE 9 is a forward end elevation of the stopper.
Figure 8:
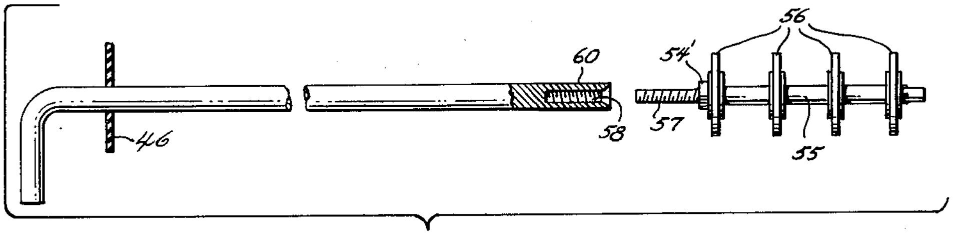
FIGURE 8 is an exploded axial section of the stopper and stopper puller.

The other equipment normally used includes a stopper 54' (FIGURES 8 and 9) of suitable type consisting of a stopper body 55 and a series of rubber or other suitable stopper washers 56 mounted on the body.

The stopper has a threaded rear end 57, which cooperates with female threads 58 on the forward end of a stopper puller 60 which is provided with a rubber washer type gasket 46 which is capable of connection with the gasket retainer at the rear end of the tool extension casing.

In operation of the device and in practicing the method for the purpose of modifying gas piping or the like while it is under pressure, I preferably proceed as follows:

Let us assume that existing gas piping 62 includes, adjacent the location where the change is to be made, a T 63 (FIGURE 10) which at one arm is closed by a threaded plug 64.

The wrench end of the head 50 is inserted on the plug, suitably by driving it firmly on the plug, and preferably using a magnetized wrench head which will hold its position. Then, inserting a wrench handle 51' in the wrench head, the plug is loosened until it is retained in the T merely fingertight. The wrench handle is then removed.

Figure 11:
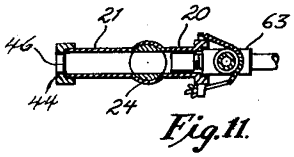

With the wrench head still in place on the outer end of the plug, the tool extension casing is positioned with its forward end 36 engaging and surrounding the shoulder of the T 63 around the plug 64 (FIGURE 11). The tool extension casing is anchored in position by carrying the helical tension spring 38 around the back of the T 63 and anchoring the wing nut behind the dogs on the casing, placing the wing nut stud between the dogs. Tightening the wing nut therefore places the spring 38 under tension and firmly anchors the tool extension casing with the axis of its bore in line with the axis of the plug.

Figure 12:
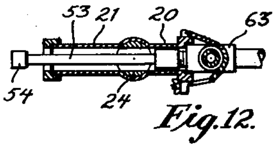

With the valve 24 in the tool extension casing open, and both gaskets 45 and 46 in place at the back end of the tool extension casing, the stem 53 of the wrench extension is forced through the opening in the washer type gasket 46 and forced forward until it engages and seats in the squared rear recess of the wrench head 50 (FIGURE 12).

The interior of the tool extension casing is now sealed against any escape of gas by the forward gasket 37 which seals the casing to the T and by the washer gasket 46 at the rear which seals the wrench extension to the casing. By turning the wrench extension using the fingers or supplemented by a handle as desired, the service man unscrews the plug and then pulls the wrench extension wrench head and plug rearward away from the T until the plug is positioned within the casing rearward of the valve. It is important, of course, that there be sufficient length in the rear tubular porition 21 of the tool extension casing to receive the wrench head and the plug without interfering with the valve.

Figure 13:
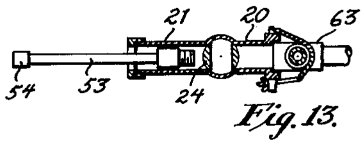
Figure 14:
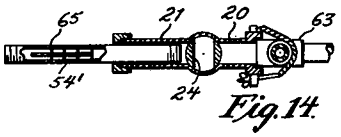

The valve 24 is now closed, thus closing against escape of gas from the interior of the tool extension casing (FIGURE 13).

By unthreading the gasket nut 44, the serviceman is now able to remove the plug, wrench head and wrench from gasket nut. The gasket 46 is also removed from the gasket nut at this point.

The serviceman next inserts a stopper 54' in the interior of a piece of pipe 65 of suitable length threaded at both ends. Actually in many cases it will be most convenient to use a standard nipple of desired length. The stopper seals against leakage through the interior of the pipe.

The piece of pipe 65 is inserted through the gasket nut and pushed through the gasket 45 with the large interior opening, and inserted in the rear end of the tool extension casing, after which the gasket nut is tightened until the gasket 45 is firmly engaged with the outside of the piece of pipe 65. There is now a seal at the rear of the tool extension casing by reason of the gasket around the outside of the pipe and the stopper on the inside of the pipe.

Figure 15:
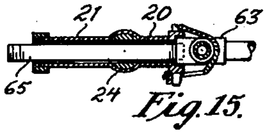

The user now opens the valve 24 and pushes the pipe forward until its threads engage in the threads of the T formerly occupied by the plug (FIGURE 15). An important feature is that many times the axis of threads in a T or other fitting is not perfectly aligned. To correct for that, the tool extension casing can be shifted slightly with respect to the T without losing the gas-tight seal provided by the front gasket 37 provided around the outside of the T.

Of course it will be evident that the user can be sure that the pipe 65 is firmly sealed with respect to the tool extension casing by tightening the gasket nut 44 at the rear of the casing so that the spherical surfaces of the rear gasket and gasket nut will cooperate to maintain the rear gasket in firm engagement with the pipe.

The valve is now opened, the pipe is pushed forward and engaged in the threads in the T and threaded with sufficient tightness to hold it permanently in the T.

Figure 16:
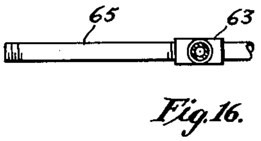

Next the tool extension casing is removed by first loosening the gasket nut 44 at the rear of the casing, then slackening up on the wing nut 41 and removing the wing nut, stud and spring from their position around the T or other fitting, and then pulling the casing axially until it leaves the end of the pipe remote from the T (FIGURE 16).

Figure 17:
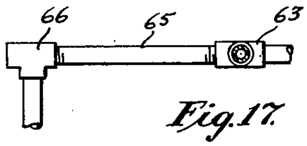

The next operation is to thread one of the through ends of a new T 66 on the end of the pipe 65 which is remote from the previous T (FIGURE 17). Further pipe work can then be done connecting to the side outlet of the new T, which can extend to the new installation, or other desired location.

Figure 18:
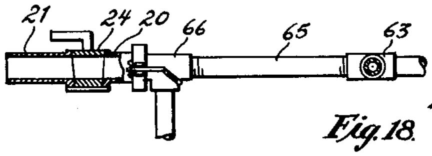

When the new piping is complete, and everything is ready to permit it to be filled with gas or other fluid, the tool extension casing is now attached to the unused through end of the new T 66 (FIGURE 18). This involves bringing the forward end of the casing into position with its gasket 37 around the shoulder of the T, and then wrapping tension spring 28 around the new T 66 and engaging and tightening the wing nut on the dogs.

Figure 19:
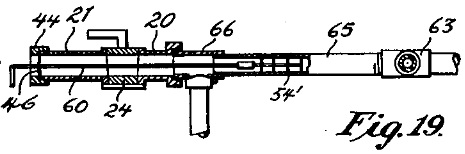
Figure 20:
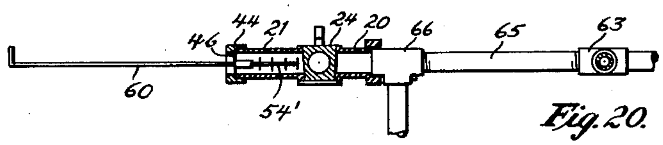

Now the rear gasket nut of the tool extension casing is removed, and the washer gasket 46 is inserted and the gasket nut 44 threaded on the rear of the tool extension casing. A stopper puller 60 is then forced through the opening of the washer gasket 46 sealing against leakage, and with the valve in the tool extension casing open, is carried forward until it can be threaded on to the outer end of the stopper 54' (FIGURE 19). By a pull on the stopper puller, the stopper is pulled out of the piece of pipe 65 first inserted, and the stopper puller and stopper are withdrawn until the inner end of the stopper puller and the stopper remain in the outer portion of the casing beyond the valve 24. It is important that the outer portion of the casing be long enough to hold the stopper puller and stopper at this time (FIGURE 20).

The valve 24 in the tool extension casing is now closed, the gasket nut 44 at the rear end of the casing is opened and the stopper and stopper puller are removed endwise from the tool extension casing with gasket 46, and gasket 46 is replaced.

Figure 21:
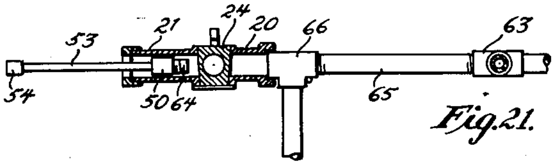
Figure 22:
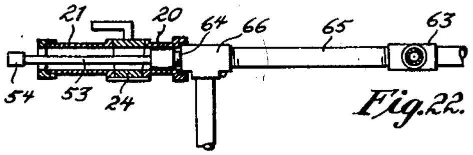

Next, the wrench extension shank 51 is forced through the opening in the washer gasket 46, and the wrench head 50 with the pipe plug 64 attached is forced on the wrench extension. The plug, wrench and wrench head and wrench extension are inserted in the outer end of the casing, and the gasket nut is tightened on the rear end of the casing (FIGURE 21).

The serviceman now opens the valve, pushes the plug, wrench head and wrench extension forward (FIGURE 22) and operating from the rear end of the casing on the wrench extension, threads the pipe plug 64 in the outer through opening of the T until it at least achieves finger tightness.

Figure 23:
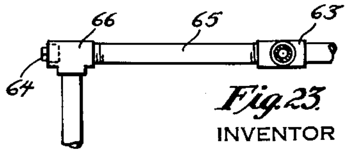

The serviceman next pulls the wrench extension off the wrench head. He then detaches the tool extension casing from the T by slackening on the wing nut 41 and then pulling the stud 40 from its position between the dogs, and unwrapping the tension spring 38 from its position around the T. The serviceman then pulls the tool extension casing bodily off the T. The pipe plug 64 is tightened to its desired condition of tightness (FIGURE 23).

It will be evident that in the procedure according to the invention, the connection of new piping to the old piping has been accomplished as above described without permitting annoying gas leakage and without pressure drop which would be detrimental to other appliances, and without delay and inconvenience which would be occasioned by shutting off the gas.

In some cases the principles of the invention will be applied for the purpose of producing a temporary bypass or the like, as to permit replacement of a master meter.

In FIGURE 24, I illustrate a service inlet 66' which passes through a T 67 as well known, and then through pipe 68 and a valve or cock 70 to the meter 71. From the meter it passes through a valve or cock 72, piping 73 and a T 74 to suitable uprights 75 which extend to individual appliance locations.

In normal practice the T 67 is plugged at a lower through end 76 and the T 74 is plugged at a lower through end 77.

By means of the invention it is possible to provide a bypass so that the service can be retained while the meter is removed and replaced.

In this form of the invention one tool extension casing 78 is connected at the T 67 around the plug 76 and another tool extension casing 80 is secured to the T 74 around the plug 77.

Using the technique already described, each of the plugs 76 and 77 is removed and the valves in the tool extension closed. A jumper pipe 81 including a suitable plastic or flexible piping stretch 82, cocks 83 and 84 and unions 85 and 86 and end pipes 87 and 88 are threaded into the threads which formerly received the plugs 76 and 77 using the technique already described for inserting the end pipe 65 through the tool extension casings except that the cocks 83 and 84 are closed instead of employing stoppers.

When the operation is finished, the tool extension casings remain in place during the use of the jumper, and when the meter 71 has been replaced, closing cocks 70 and 72 while the meter is replaced, the jumper 81 is taken off using the reverse of the above operations, and reinserting the plugs 76 and 77 in the manner already described.

It will be evident, of course, that the principles of the invention can be used to cut out a leaking line. In this case the tool extension casing is connected to a through end of the T around a pipe plug removed using the technique as already described. Then the stopper on the end of the stopper puller is introduced through the tool extension casing and pushed out into the pipe on the other through end of the tee, thus plugging the pipe at such other end, where the leak is occurring. The serviceman can then cut out the leaking pipe beyond the stopper, make such repairs as he desires, and suitably connect to the end of the formerly leaking pipe. The stopper is then pulled and the plug reinserted using the previous technique.

The principles of the invention can also be used in connection with the cleaning out of piping. For example, where a deposit of rust or other foreign matter occurs in a gas pipe or the like above or in the T at the bottom of an upright, the plug at the bottom of the upright can be removed using the tool extension casing of the present invention and the stopper puller rod can be introduced through the tool extension casing in order to loosen any deposit and allow it to drop into the tool extension casing. Usually such a deposit falls when the plug is removed. Then after the deposit has been allowed to drop the valve can be closed, the deposit can be removed and the plug reinserted.

In view of my invention and disclosure variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. In a pipe tool for connecting and sealing a wrench to a plug in a pipe fitting for removal of said plug while maintaining gas-tight conditions in the area surrounding the plug, a tubular casing having a straight bore which extends through the casing from end to end, a plug valve intermediate the ends of the casing provided with a valve opening which aligns in open position of the valve with the interior bore of said casing, said straight bore of the casing extending on both sides of the plug valve, a gasket socket at the forward end of the casing for surrounding the end of said pipe fitting, gasket means having a socket, engaged in the casing socket and adapted to surround the end of said pipe fitting, fastening means at the forward end of the casing for fastening the casing to said pipe fitting, a gasket retainer at the rear end of the casing, removable second gasket means in the gasket retainer having a relatively small opening with respect to said straight bore, said relatively small opening being adapted to seal to said wrench, removable third gasket means at the rear end of the casing in said gasket retainer having an opening conforming in diameter with said straight bore and adapted to seal to a length of pipe, and means for tightening said third gasket means.

2. A pipe tool of claim 1, in which said fastening means to the pipe fitting is resilient.

References Cited in the file of this patent

UNITED STATES PATENTS

| | | |
|---|---|---|
| 174,542 | Letzkus | Mar. 7, 1876 |
| 571,077 | Sheridan | Nov. 10, 1896 |
| 1,701,691 | Mueller | Feb. 12, 1929 |
| 2,171,577 | Larry | Sept. 5, 1939 |
| 2,187,838 | Penick | Jan. 23, 1940 |
| 2,276,443 | Wilson | Mar. 17, 1942 |
| 2,314,921 | Bunnell | Mar. 30, 1943 |
| 2,510,513 | Mueller | June 6, 1950 |
| 2,581,914 | Darrow | Jan. 8, 1952 |
| 2,756,486 | Smith | July 31, 1956 |